United States Patent
Billieres

(10) Patent No.: US 8,337,584 B2
(45) Date of Patent: Dec. 25, 2012

(54) COATING FOR A DEVICE FOR FORMING GLASS PRODUCTS

(75) Inventor: Dominique Billieres, Saint Saturnin les Avignon (FR)

(73) Assignee: Saint-Gobain Coating Solution, Avignon (FR)

( * ) Notice: Subject to any disclaimer, the term of this patent is extended or adjusted under 35 U.S.C. 154(b) by 649 days.

(21) Appl. No.: 12/389,629

(22) Filed: Feb. 20, 2009

(65) Prior Publication Data

US 2010/0132409 A1    Jun. 3, 2010

Related U.S. Application Data

(63) Continuation-in-part of application No. 12/325,387, filed on Dec. 1, 2008, now abandoned.

(51) Int. Cl.
   *B22F 1/00*    (2006.01)
   *C09D 1/00*    (2006.01)
   *C03B 11/08*   (2006.01)
   *C03B 9/48*    (2006.01)

(52) U.S. Cl. ............ 75/252; 65/374.11; 65/374.12; 106/286.2; 106/286.3; 106/286.4; 106/286.5; 427/455

(58) Field of Classification Search ........... 65/374.11, 65/374.12
See application file for complete search history.

(56) References Cited

U.S. PATENT DOCUMENTS

| | | | | |
|---|---|---|---|---|
| 4,692,305 | A * | 9/1987 | Rangaswamy et al. | 420/436 |
| 5,652,877 | A * | 7/1997 | Dubois et al. | 428/553 |
| 6,533,285 | B2 * | 3/2003 | Nava et al. | 277/415 |
| 6,749,951 | B1 * | 6/2004 | Darolia et al. | 428/615 |
| 7,670,406 | B2 * | 3/2010 | Belashchenko | 75/252 |
| 2005/0226955 | A1 * | 10/2005 | Yuasa et al. | 425/406 |
| 2007/0144621 | A1 * | 6/2007 | Farmer et al. | 148/403 |
| 2008/0257200 | A1 * | 10/2008 | Minevski et al. | 106/1.18 |

* cited by examiner

*Primary Examiner* — Roy King
*Assistant Examiner* — Ngoclan T Mai
(74) *Attorney, Agent, or Firm* — Oblon, Spivak, McClelland, Maier & Neustadt, L.L.P.

(57) ABSTRACT

The invention relates to
- a coating for a device for forming glass products, comprising:
  - a first quasicrystalline or approximant or amorphous metallic phase; and
  - a second phase composed of a eutectic alloy having a melting point between 950 and 1150° C. and having a nominal hardness between 30 and 65 HRc;
- a mould for manufacturing hollow glass products that is provided with this coating;
- equipment for forming glass in sheets or plates that is provided with this coating;
- a material constituting this coating;
- a premixed or prealloyed powder, or a flexible cord or cored-wire that makes it possible to obtain this coating;
- a thermal spraying process for obtaining this coating.

28 Claims, No Drawings

COATING FOR A DEVICE FOR FORMING GLASS PRODUCTS

REFERENCE TO PRIOR APPLICATIONS

This application is a continuation-in-part of to U.S. application Ser. No. 12/325,387 filed Dec. 1, 2008 now abandoned, incorporated herein by reference.

The present invention relates to the forming of glass products, in which molten glass is subjected to a certain contact time with a metallic or similar surface.

Hollow glass products such as bottles, flasks, jars, etc. and glass products in the form of plates, sheets, etc. are especially targeted.

The moulds used for manufacturing glass containers (bottles, jars, flasks, etc.), whether they are made of cast iron or of copper alloys (bronzes), currently require intensive lubrication to prevent the glass from sticking in the cavity. This lubrication is provided by application of preparations containing solid lubricants, such as graphite, and the lubricating product must be applied very frequently (every 1 to 2 hours), to the hot mould during production. This operation has the follow major drawbacks:

generation of risk situations (vaporization of some of the products supplied into the atmosphere of the factory, slippery floor by re-deposition of these lubricants on the floor, manual swabbing action on a machine, etc.);

loss of productivity (after each provision of lubricant, the first bottles produced by the mould are scrapped).

The inventors have consequently sought to develop a semi-permanent non-stick coating that has a set of qualities that have never been combined until now.

The coating must be non-stick with respect to the glass parison at high temperature, without provision of lubricating products or with a minimum provision.

It must be wear resistant and offer a service life that renders the induced additional cost economically viable. In particular, a good mechanical resistance of the coating to the high contact temperatures with the molten glass is required, and also to the closure of the mould onto cold glass capable of causing a dent in certain zones of the mould cavity (mainly the sharp edges).

The coating must, on the other hand, withstand large thermal shocks (expansion, thermomechanical stresses).

Also very particularly sought is the compatibility of the coating with the operations for repairing moulds such as those which are commonly carried out in manufacturing plants: local rebuilding by brazing of a NiCrBFeSi type powder (eutectic powder, melting point 1055 to 1090° C.). These repair operations are inevitable and are made necessary by the aforementioned small incidents on closing the mould onto cold glass. The coating must withstand the provision of building-up product with in situ remelting at high temperature using a special blow torch and, better still, to offer metallurgical compatibility with these rebuilding materials so that the repaired part is coherent with the rest of the coating of the cavity.

Finally, the coating must have a sufficient thermal conductivity in order not to excessively impair the extraction of heat from the glass by the forming device (mould, etc.).

The desired objectives have been achieved by the invention, one subject of which is a coating for a device for forming glass products comprising a first quasicrystalline or approximant or amorphous metallic phase and a second phase composed of a eutectic alloy having a melting point between 950 and 1150° C. and having a nominal hardness between 30 and 65 HRc.

In the present text, the expression "quasicrystalline phase" denotes phases that exhibit rotational symmetries normally incompatible with translational symmetry, i.e. symmetries with a 5-, 8-, 10- or 12-fold rotation axis, these symmetries being revealed by the diffraction of radiation. By way of example, mention may be made of the icosahedral phase I of point group $m\overline{3}\overline{5}$ (cf. D. Shechtman, I. Blech, D. Gratias, J. W. Cahn, Metallic Phase with Long-Range Orientational Order and No Translational Symmetry, Physical Review Letters, Vol. 53, No. 20, 1984, pages 1951-1953) and the decagonal phase D of point group 10/mmm (cf. L. Bendersky, Quasicrystal with One Dimensional Translational Symmetry and a Tenfold Rotation Axis, Physical Review Letters, Vol. 55, No. 14, 1985, pages 1461-1463). The X-ray diffraction diagram of a true decagonal phase was published in "Diffraction approach to the structure of decagonal quasicrystals, J. M. Dubois, C. Janot, J. Pannetier, A. Pianelli, Physics Letters A 117-8 (1986) 421-427".

The expressions "approximant phases" or "approximant compounds" here denote true crystals insofar as their crystallographic structure remains compatible with the translational symmetry, but which exhibit, in the electron diffraction photograph, diffraction patterns whose symmetry is close to the 5-, 8-, 10- or 12-fold rotation axes.

The expression "amorphous alloy" is understood to mean an alloy that contains only an amorphous phase or an alloy in which some crystallites may be present in the midst of a predominantly amorphous phase.

According to the preferred features of the coating of the invention:

it comprises a third solid lubricant phase;

said first, second and third phases are present in amounts of 30-75 vol %, respectively 70-25 vol % and respectively 0-30 vol %, and preferably 45-65 vol %, respectively 45-25 vol % and respectively 0-20 vol %; an amount below 30% by volume of said first phase does not make it possible to obtain a sufficient non-stick effect; an amount below 25% by volume of said second phase reduces the compatibility of the coating with the aforementioned operations for repairing the mould below the required level and increases its brittleness; the presence of said third phase may be particularly favoured in a process that requires good slip of the glass over the glass-forming tool; and said first phase is a quasicrystalline and/or approximant phase and comprises an aluminium-based alloy and/or said first phase is an amorphous metallic phase and comprises a zirconium-based alloy and/or a high-entropy alloy; said first phase may comprise several of the aforementioned constituents as a mixture.

Numerous examples of aluminium-based alloys capable of being incorporated into the composition of said first quasicrystalline phase may be mentioned.

Document FR 2 744 839 describes quasicrystalline alloys having the atomic composition $Al_aX_dY_eI_g$ in which X represents at least one element chosen from B, C, P, S, Ge and Si, Y represents at least one element chosen from V, Mo, Cr, Mn, Fe, Co, Ni, Ru, Rh and Pd, I represents the inevitable processing impurities, $0 \leq g \leq 2$, $0 \leq d \leq 5$, $18 \leq e \leq 29$, and $a+d+e+g=100\%$.

Document FR 2 671 808 describes quasicrystalline alloys having the atomic composition $Al_aCu_bCo_b$, $(B,C)_cM_dN_eI_f$, in which M represents one or more elements chosen from Fe, Cr, Mn, Ru, Mo, Ni, Os, V, Mg, Zn and Pd, N represents one or more elements chosen from W, Ti, Zr, Hf, Rh, Nb, Ta, Y, Si, Ge and rare earths, and I represents the inevitable processing impurities, where $a \geq 50$, $0 \leq b \leq 14$, $0 \leq b' \leq 22$, $0 < b+b' \leq 30$, $0 \leq c \leq 5$, $8 \leq d \leq 30$, $0 \leq e \leq 4$, $f \leq 2$ and $a+b+b'+c+d+e+f=100\%$.

The alloys having the composition $Al_a Cu_b Co_{b'}(B,C)_c M_d N_e I_f$, where $0 \leq b \leq 5$, $0 < b' < 22$, $0 < c < 5$, and M represents Mn+Fe+Cr or Fe+Cr are particularly mentioned.

Z. Minevski, et al., (Symposium MRS Fall 2003, "Electro-codeposited Quasicristalline Coatings for Non-stick, Wear Resistant Cookware" cites the alloy $Al_{65}Cu_{23}Fe_{12}$.

Also perfectly suitable, within the context of the present invention, are the aluminium-based alloys described in document WO 2005/083139 that contain more than 80% by weight of one or more quasicrystalline or approximant phases, having the atomic composition $Al_a(Fe_{1-x}X_x)_b(Cr_{1-y}Y_y)_c Z_z J_j$ in which:

X represents one or more elements that are isoelectronic with Fe, chosen from Ru and Os;

Y represents one or more elements that are isoelectronic with Cr, chosen from Mo and W;

Z is an element or a mixture of elements chosen from Ti, Zr, Hf, V, Nb, Ta, Mn, Re, Rh, Ni and Pd;

J represents the inevitable impurities, other than Cu;

$a+b+c+z=100$;

$5 \leq b \leq 15$; $10 \leq c \leq 29$; $0 \leq z \leq 10$;

$xb \leq 2$;

$yc \leq 2$;

$j \leq 1$.

In one particular embodiment, the quasicrystalline alloy has an atomic composition $Al_a Fe_b Cr_c J_j$, in which:

$a+b+c+j=100$;

$5 \leq b \leq 15$; $10 \leq c \leq 29$; $j<1$.

The following examples of aluminium-based alloys that may be incorporated into the composition of said first approximant phase may be mentioned.

Firstly, mention is made of the orthorhombic phase $O_1$, characteristic of an alloy having the atomic composition $Al_{65}Cu_{20}Fe_{10}Cr_5$, the unit cell parameters of which are: $a_0^{(1)}=2.366$, $b_0^{(1)}=1.267$, $c_0^{(1)}=3.252$ in nanometers. This orthorhombic phase $O_1$ is called the approximant of the decagonal phase. Moreover, it is so close thereto that it is not possible to distinguish its X-ray diffraction pattern from that of the decagonal phase.

It is also possible to mention the rhombohedral phase having parameters $a_r=3.208$ nm, $\alpha=36°$, present in the alloys having a composition close to $Al_{64}Cu_{24}Fe_{12}$ in terms of number of atoms (M. Audier and P. Guyot, Microcrystalline AlFeCu Phase of Pseudo Icosahedral Symmetry, in Quasicrystals, eds. M. V. Jaric and S. Lundqvist, World Scientific, Singapore, 1989).

This phase is an approximant phase of the icosahedral phase.

It is also possible to mention orthorhombic phases $O_2$ and $O_3$ having respective parameters $a_0^{(2)}=3.83$, $b_0^{(2)}=0.41$, $c_0^{(2)}=5.26$ and $a_0^{(3)}=3.25$, $b_0^{(3)}=0.41$, $c_0^{(3)}=9.8$ in nanometers, which are present in an alloy of composition $Al_{63}Cu_{17.5}Co_{17.5}Si_2$ in terms of number of atoms or else the orthorhombic phase $O_4$ having parameters $a_0^{(4)}=1.46$, $b_0^{(4)}=1.23$, $c_{0(4)}=1.24$ in nanometers that is formed in the alloy of composition $Al_{63}Cu_8 Fe_{12}Cr_{12}$ in terms of number of atoms. Orthorhombic approximants are described, for example, in C. Dong, J. M. Dubois, J. Materials Science, 26 (1991), 1647.

Mention may also be made of a C phase, of cubic structure, very often observed to coexist with true quasicrystalline or approximant phases. This phase which is formed in certain Al—Cu—Fe and Al—Cu—Fe—Cr alloys, consists of a superstructure, due to the effect of chemical order of the alloy elements with respect to the aluminium sites, having a phase of structure of Cs—Cl type and having a lattice parameter $a_1=0.297$ nm. A diffraction pattern of this cubic phase has been published (C. Dong, J. M. Dubois, M. de Boissieu, C. Janot; Neutron diffraction study of the peritectic growth of the $Al_{65}Cu_{20}Fe_{15}$ icosahedral quasicrystal; J. Phys. Condensed matter, 2 (1990), 6339-6360) for a sample having a pure cubic phase and having a composition $Al_{65}Cu_{20}Fe_{15}$ in terms of number of atoms.

Mention may also be made of an H phase of hexagonal structure that derives directly from the C phase as demonstrated by the epitaxial relationships, observed using electron microscopy, between crystals of the C and H phases and the simple relationships which connect the crystalline lattice parameters, namely $a_H=3\sqrt{2}\ a_1/\sqrt{3}$ (to within 4.5%) and $c_H=3\sqrt{3}\ a_1/2$ (to within 2.5%). This phase is isotypic with a hexagonal phase, denoted by ΦAlMn, discovered in Al—Mn alloys containing 40% by weight of Mn [M. A. Taylor, Intermetallic phases in the Aluminium-Manganese Binary System, Acta Metallurgica 8 (1960) 256].

The cubic phase, its superstructures and the phases that derive therefrom constitute a class of approximant phases of the quasicrystalline phases of neighbouring compositions.

On the other hand, said first phase may be an amorphous metallic phase.

Firstly, an alloy of the "Inoue" type may be mentioned. This alloy is an amorphous alloy containing, as an atomic percentage, at least 50% of elements Ti and Zr; Zr being the predominant element and being compulsorily present whereas the proportion of Ti may be zero. The elements that make up the remaining part are advantageously chosen from the group composed of Al, Co, Cr, Cu, Fe, Ni, Si, Mn, Mo and V. The alloy compositions particularly targeted are $Zr_{48.5}Ti_{5.5}Al_{11}Cu_{22}Ni_{13}$, $Zr_{55}Cu_{30}Al_{10}Ni_5$, $Zr_{55}Ti_5Ni_{10}Al_{10}Cu_{20}$, $Zr_{65}Al_{7.5}Cu_{27.5}Ni_{10}$, $Zr_{65}Al_{7.5}Ni_{10}Cu_{17.5}$, $Zr_{48.5}Ti_{5.5}Cu_{22}Ni_{13}Al_7$, $Zr_{60}Al_{15}Co_{2.5}Ni_{7.5}Cu_{15}$, $Zr_{55}Cu_{20}Ni_{10}Al_{15}$, in particular $Zr_{55}Cu_{30}Al_{10}Ni_5$.

Secondly, a high-entropy alloy may be mentioned. A high-entropy alloy is an alloy that does not contain one predominant element but is composed of 5 to 13 elements present in an equimolar amount which may range from 5% to 35%. The advantage is that in such an alloy the formation of random solid solutions is favoured relative to the synthesis of brittle intermetallic crystalline phases. Furthermore, it is composed of nanocrystallites dispersed in an amorphous or crystalline matrix. Typically, a high-entropy alloy contains at least 5 elements chosen from the group composed of Al, Co, Cr, Cu, Fe, Ni, Si, Mn, Mo, V, Zr and Ti. The alloy compositions that are particularly targeted are high-entropy alloys having 5 to 13 main elements in equimolar ratios, each having an atomic percentage of less than 35% such as FeCoNiCrCuAlMn, FeCoNiCrCuAl$_{0.5}$, CuCoNiCrAlFeMoTiVZr, CuTiFeNiZr, AlTiVFeNiZr, MoTiVFeNiZr, CuTiVFeNiZrCo, AlTiVFeNiZrCo, MoTiVFeNiZrCo, CuTiVFeNiZrCoCr, AlTiVFeNiZrCoCr, MoTiVFeNiZrCoCr, AlSiTiCrFeCoNiMo$_{0.5}$, AlSiTiCrFeNiMo$_{0.5}$.

Preferably, said second phase is, according to the invention, mainly composed:

of a nickel-based alloy comprising the following elements in the following amounts, indicated in % by weight:

| | |
|---|---|
| Cr: | 0-20 |
| C: | 0.01-1 |
| W: | 0-30 |
| Fe: | 0-6 |

-continued

| | |
|---|---|
| Si: | 0.4-6 |
| B: | 0.5-5 |
| Co: | 0-10 |
| Mn: | 0-2 |
| Mo: | 0-4 |
| Cu: | 0-4 | or of a cobalt-based alloy comprising the following elements in the following amounts, indicated in % by weight:

| | |
|---|---|
| Ni: | 10-20 |
| Cr: | 0-25 |
| C: | 0.05-1.5 |
| W: | 0-15 |
| Fe: | 0-5 |
| Si: | 0.4-6 |
| B: | 0.5-5 |
| Mn: | 0-2 |
| Mo: | 0-4 |
| Cu: | 0-4 | or of a mixture of two such alloys.

According to one advantageous embodiment, said third phase, the presence of which is optional, is mainly composed of at least one of the following compounds, or of a mixture of several of them:

- $XF_2$ where X is chosen from Ca, Mg, Sr, Ba, in particular $CaF_2$, $MgF_2$ and $BaF_2$,
- $XF_3$ where X is chosen among Sc, Y, La, or any other rare earth elements
- BN with hexagonal structure,
- $MoS_2$ (molybdenite), $WS_2$ (tungstenite), CrS,
- $X_2MoOS_3$ where X is Cs or Ni,
- $M_aSi_b$ where M=Mo, W, Ni or Cr, for example $MoSi_2$,
- $X_aB_b$ where X is Mo, Cr, Co, Ni, Fe, Mn, V, Ti or Zr, in particular $TiB_2$, $ZrB_2$,
- $X_aY_bB_c$ where X and Y are chosen from Mo, Cr, Co, Ni, Fe, Mn, V, Ti and Zr, in particular MoCoB or $Mo_2NiB_2$,
- XSiB where X is Mo, Cr, Co, Ni, Fe, Mn, V, Ti or Zr.

According to the invention, the thickness of the coating is, in ascending order of preference:
- at least equal to 5, 10, 20 μm on the one hand; and
- at most equal to 500, 350, 200 μm on the other hand.

Other subjects of the invention are:
- a mould for manufacturing hollow glass products, in particular a blank mould, including the bottom baffle, of which at least one part of the cavity comprises a coating as described above;
- equipment for forming glass in sheets or plates, of which at least one part of the surface in contact with the glass comprises a coating as described above;
- a material constituting such a coating;
- a premixed or prealloyed powder that makes it possible to obtain the coating;
- a flexible bead or flux-cored wire that makes it possible to obtain the coating; and
- a thermal spraying process for obtaining the coating, in particular of the plasma spray or HVOF (High Velocity Oxy-Fuel) type.

The invention is illustrated by the following exemplary embodiment.

EXAMPLE a) Surface Preparation by Abrasive Jet

After masking the zones that don't need or can't be coated, the surface is prepared by spraying abrasive alumina-zirconia grains of 80 mesh size (i.e. an average diameter of 180 μm). This material is preferred for its high tenacity that limits the fracturing of the grains and consequently the inclusion of grain fractions in the surface, inclusions that are detrimental to the adhesion of the coating.

b) Preparation of the Material to be Sprayed to Form the Coating

A first phase A is formed from a "quasicrystalline" powder, the composition of which in % by weight is:

| | |
|---|---|
| Aluminium | 54.1 |
| Copper | 17.8 |
| Iron | 13 |
| Chromium | 14.9 |

Particle size distribution of the phase A powder=25 to 60 μm (approximately 10% of the particles only are smaller than 25 μm and 10% of the particles only are larger than 60 μm).

A second phase B is formed from a powder of a nickel-based alloy, the composition of which in % by weight is:

| | |
|---|---|
| Chromium | 7.8 |
| Iron | 2.45 |
| Boron | 1.6 |
| Silicon | 3.6 |
| Carbon | 0.26 |
| Nickel | remainder |

Particle size distribution of the phase B powder=15 to 45 μm (approximately 10% of the particles only are smaller than 15 μm and 10% of the particles only are larger than 45 μm).

The phases A and B are combined in the proportion of 40 vol % of product B per 60 vol % of product A.

The two powders A and B are mixed so as to obtain a homogeneous distribution in the amount of powder prepared. This composite mixture is used to produce the coating.

c) Production of the Coating by Spraying

The coating is produced by thermal spraying of the mixture prepared previously. The spraying process is the HVOF (High Velocity Oxy-Fuel) process. This spraying process uses equipment composed of the following components:
- the spray gun is a K2 model of GTV GmbH manufacture (D);
- the control unit; and
- the powder feeder.

In the example described, the gun K2 operates on the principle of combustion of oxygen and of Exxsol® D60 kerosene (trademark of Exxon Mobil), at high flow rates, with a nozzle that generates a very high velocity flame. The gun is cooled by circulation of chilled water. The composite powder to be sprayed is injected into the combustion chamber, it is then sprayed at high velocity while being carried in the heart of the flame, and is therefore partially or completely molten during its journey before impacting the surface of the part to be coated (principle known from thermal spraying).

The spray gun is attached to a handling robot that is programmed to scan the whole of the surface to be coated while maintaining an orientation such that the angle of impact of the particles on the surface is close to 90°, and while ensuring a scanning speed that is controlled and that is chosen to obtain the desired thicknesses.

The spraying parameters of the example described are the following:

| Parameters | Units | Control value |
|---|---|---|
| Oxygen flow rate | [l/min] | 800 |
| Kerosene flow rate | [l/h] | 20 |
| λ (flame stoichiometric ratio) | | 1.15 |
| Combustion chamber pressure | [bar] | 7.2 |
| Nozzle design | [mm] | 150/12 |
| Powder carrier gas | [l/min] | 7.2 |
| Powder flow rate | [g/min] | 2 × 40 |
| Sweep rate | [m/s] | 1.6 |
| Spray gun/part spraying distance | [mm] | 400 |

The scanning cycle carried out by the robot is adjusted so that the thickness of the coating obtained is between 50 and 100 μm.

It should be noted that the loss of phase A in the implementation of this process is greater than that of phase B, so that the coating obtained only contains 55 vol % of phase A per 45 vol % of phase B.

d) Finishing of the Coating

After thermal spraying, a final operation of polishing the surface of the coating is carried out. This operation consists in:

removing the possible surplus coating on the parting line of the mould;

reducing the surface roughness of the mould in order to decrease it to a value of around 2 to 3 μm (Ra). This operation is preferably carried out using flap wheels of applied abrasives and a suitable machine that rotates these flap wheels and applies a pressure to the surface of the mould.

The final thickness of the coating is checked (zone by zone) before use of the mould.

e) Evaluation, Test of the Coating

The coated moulds are finished according to the rules of the art of this industry, by applying a protective lacquer or varnish of the Permaplate® type in the same way as it would be done for uncoated moulds (application then curing of the varnish in an oven).

The (blank) moulds are then mounted in a bottle-forming machine (IS type) and used without provision of lubricating product. Usually, sprays based on lubricating products (graphite, BN or other type) are regularly sprayed over the moulds (with a periodicity of a few hours) in order to facilitate the entry of the glass parison into the mould and to prevent it from sticking.

With the coating described in this patent, no lubrication is necessary during operation.

The methodology consists in simultaneously testing between 4 and 8 moulds having one and the same version of the coating and in estimating the service life of the coating on the basis of 2 criteria:

when the mould no longer operates correctly (parison that does not correctly enter the mould, start of sticking), the mould is removed from the machine and inspected. The number of bottles produced is recorded;

in the case where an incident that is unrelated to the coating occurs, the same methodology is applied: local repair in the case of a dent in the material for example. The mould is then remounted in the machine.

The local repair procedure is carried out according to the rules of the art in this industry, by providing material by brazing, then resurfacing.

f) Benefits Provided by the Coating

Due to the fact that no lubrication is required during operation, the drawbacks linked to this lubrication disappear by virtue of the coating that is the subject of the invention:

a saving is made due to the lack of consumption of lubricating products;

elimination of the associated risks linked to the safety of the work station: inhalation of vapours of chemicals released during the operation of lubricating a hot mould, surrounding area made slippery by redeposition around the machine of the partially vaporized lubricating substance, risk of entanglement even of the arm of the operator who applies the lubricant;

reduction in the amount of scrap: when the lubrication of the moulds is carried out, the bottles produced by the mould that has just been lubricated are scrapped.

The example described above has made it possible to quantify the following gains:

| Scrap in bottle production | With the coating that is the subject of the invention | Without coating and with lubrication |
|---|---|---|
| Amount of scrap from machine | 2% | 3.5% |
| Amount of scrap from final inspection | 0.35% | 0.8% |

This performance was measured over a total of 32 moulds coated according to the example described above and compared with 32 uncoated moulds, in the course of a 2-week production run. The number of bottles scrapped from the coated moulds was reduced by 37000 units compared to the production from moulds that were uncoated (and had lubrication).

g) Qualities of the Coating That is the Subject of the Invention

Its thermal conductivity is compatible with the process and does not radically change the heat transfer between the mould and the glass parison, which means that it does not significantly modify the operating parameters of the machine manufacturing the bottles.

The coating that is the subject of the invention has a service life of around at least 200-400 hours or around 160,000 to 320,000 articles. In other embodiments, it is possible to achieve a service life of 1000 hours or 800,000 articles.

The coating that is the subject of the invention is compatible with the standard operations for repairing moulds as carried out conventionally according to the following procedure:

preparation of the zone to be repaired by optional grinding to smooth out the defect;

preheating of the mould then local heating in order to reach the melting point of the nickel-based powder used for locally rebuilding (melting point between 950 and 1150° C.);

provision of material via a powder blow torch;

local remachining to restore the geometry.

Most hard coatings can't withstand such an operation; the local heating of the mould normally causes a debonding of the coating, and on the other hand no metallurgical bonding occurs between the repairing material and the coating material. In the case of the present invention, the component known as the second phase B is completely metallurgically compatible with the filler material used for repairing the moulds, that is to say that locally the two materials interdiffuse or even form an alloy, which provides a good continuity between the repair and original coating.

Furthermore, the coating of the invention has, unlike many other coatings, the ability to be removed, for example by sandblasting, after they have lost their functionality, which makes it possible to again produce a new coating as described in the present application as long as the glass-forming equipment is still capable of being used.

The invention claimed is:

1. Coating for a device for forming glass products, wherein the coating comprises:
    a first quasicrystalline or approximant or amorphous metallic phase; and
    a second phase comprising a eutectic alloy having a melting point between 950 and 1150° C. and having a nominal hardness between 30 and 65 HRc.

2. Coating according to claim 1, wherein the coating comprises a third solid lubricant phase.

3. Coating according to claim 2, wherein said first, second and third phases are present in amounts of 30-75 vol %, 70-25 vol % and up to 30 vol %, respectively.

4. Coating according to claim 1, wherein said first phase is a quasicrystalline and/or approximant phase and comprises an aluminium-based alloy and/or said first phase is an amorphous metallic phase and comprises a zirconium-based alloy and/or a high-entropy alloy.

5. Coating according to claim 1, wherein said second phase comprises:
    a nickel-based alloy comprising the following elements in the following amounts, indicated in % by weight:

| | |
|---|---|
| Cr: | 0-20 |
| C: | 0.01-1 |
| W: | 0-30 |
| Fe: | 0-6 |
| Si: | 0.4-6 |
| B: | 0.5-5 |
| Co: | 0-10 |
| Mn: | 0-2 |
| Mo: | 0-4 |
| Cu: | 0-4 | or a cobalt-based alloy comprising the following elements in the following amounts, indicated in % by weight:

| | |
|---|---|
| Ni: | 10-20 |
| Cr: | 0-25 |
| C: | 0.05-1.5 |
| W: | 0-15 |
| Fe: | 0-5 |
| Si: | 0.4-6 |
| B: | 0.5-5 |
| Mn: | 0-2 |
| Mo: | 0-4 |
| Cu: | 0-4 | or a mixture of two such alloys.

6. Coating according to claim 2, wherein said third phase comprises at least one of the following compounds, or of a mixture of two or more of them:
    $XF_2$ where X is at least one selected from the group consisting of Ca, Mg, Sr, and Ba,
    $XF_3$ where X is at least one selected from the group consisting of rare earth elements,
    BN with hexagonal structure,
    at least one selected from the group consisting of $MoS_2$, $WS_2$, and CrS,
    $X_2MoOS_3$ where X is Ni, and
    XSiB where X is Mo, Cr, Co, Ni, Fe, Mn, V, Ti or Zr.

7. Coating according to claim 1, wherein its thickness is at least equal to 5 μm.

8. Coating according to claim 1, wherein its thickness is at most equal to 500 μm.

9. Mould for manufacturing hollow glass products comprising a baffle including a cavity, wherein at least one part of the cavity comprises a coating according to claim 1.

10. Equipment for forming glass in sheets or plates, of which at least one part of the surface in contact with the glass comprises a coating according to claim 1.

11. Material constituting a coating according to claim 1.

12. Coating according to claim 2, wherein said first, second and third phases are present in amounts of 45-65 vol %, 45-25 vol % and up to 20 vol %, respectively.

13. Coating according to claim 1, wherein its thickness is at least equal to 20 μm.

14. Coating according to claim 1, wherein its thickness is at most equal to 200 μm.

15. Coating according to claim 6, wherein said third phase comprises $XF_3$ where X is at least one selected from the group consisting of Sc, Y and La.

16. Coating according to claim 6, wherein said third phase comprises $XF_2$ where X is at least one selected from the group consisting of Ca, Mg, Sr, and Ba.

17. Coating according to claim 6, wherein said third phase comprises $XF_3$ where X is at least one selected from the group consisting of rare earth elements.

18. Coating according to claim 6, wherein said third phase comprises BN with hexagonal structure.

19. Coating according to claim 6, wherein said third phase comprises at least one selected from the group consisting of $MoS_2$, $WS_2$, and CrS.

20. Coating according to claim 6, wherein said third phase comprises $X_2MoOS_3$ where X is Ni.

21. Coating according to claim 2, wherein said third phase comprises $MSi_2$ where M=Mo, W, Ni or Cr.

22. Coating according to claim 2, wherein said third phase comprises a boride compound comprising boron and at least one metal selected from the group consisting of Mo, Cr, Co, Ni, Fe, Mn, V, Ti and Zr.

23. Coating according to claim 2, wherein said third phase comprises a boride compound comprising boron and at least two metals selected from the group consisting of Mo, Cr, Co, Ni, Fe, Mn, V, Ti and Zr.

24. Coating according to claim 6, wherein said third phase comprises XSiB where X is Mo, Cr, Co, Ni, Fe, Mn, V, Ti or Zr.

25. Coating according to claim 16, wherein said third phase comprises $XF_2$ selected from the group consisting of $CaF_2$, $MgF_2$ and $BaF_2$.

26. Coating according to claim 21, wherein said third phase comprises $MoSi_2$.

27. Coating according to claim 22, wherein said third phase comprises $TiB_2$ and/or $ZrB_2$.

28. Coating according to claim 23, wherein said third phase comprises MoCoB and/or $Mo_2NiB_2$.

* * * * *